US009516274B2

(12) United States Patent
Deigmoeller et al.

(10) Patent No.: US 9,516,274 B2
(45) Date of Patent: Dec. 6, 2016

(54) SENSING SYSTEM AND METHOD FOR DETECTING MOVING OBJECTS

(71) Applicant: HONDA RESEARCH INSTITUTE EUROPE GMBH, Offenbach/Main (DE)

(72) Inventors: Joerg Deigmoeller, Offenbach (DE); Julian Eggert, Offenbach (DE); Nils Einecke, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 657 days.

(21) Appl. No.: 13/967,772

(22) Filed: Aug. 15, 2013

(65) Prior Publication Data

US 2014/0049644 A1 Feb. 20, 2014

(30) Foreign Application Priority Data

Aug. 20, 2012 (EP) ..................................... 12180995

(51) Int. Cl.
*H04N 7/18* (2006.01)
*G06K 9/00* (2006.01)
*G06T 7/20* (2006.01)

(52) U.S. Cl.
CPC ............ *H04N 7/18* (2013.01); *G06K 9/00805* (2013.01); *G06T 7/2006* (2013.01); *G06T 2207/10016* (2013.01); *G06T 2207/30252* (2013.01); *G06T 2207/30261* (2013.01)

(58) Field of Classification Search
CPC ...................................................... H04N 7/18
See application file for complete search history.

(56) References Cited

U.S. PATENT DOCUMENTS

| 6,259,359 | B1 | 7/2001 | Fujinami et al. |
| 7,925,441 | B2 | 4/2011 | Maemura et al. |
| 8,644,557 | B2 * | 2/2014 | Kim .................. G06K 9/00664 382/103 |

(Continued)

FOREIGN PATENT DOCUMENTS

| EP | 2023269 A2 | 2/2009 |
| JP | 6-282655 A | 10/1994 |

OTHER PUBLICATIONS

European Search Report dated Jan. 30, 2013 corresponding to European Patent Application No. 12180995.8.

(Continued)

*Primary Examiner* — James Pontius
(74) *Attorney, Agent, or Firm* — Squire Patton Boggs (US) LLP

(57) ABSTRACT

The present invention presents a sensing system 1 and a corresponding method for detecting moving objects 11 in the surroundings of a vehicle 10. The sensing system 1 comprises an imaging unit 2 for obtaining an image stream 2a, a computing unit 3 for analyzing the image stream 2a, and a control unit 4 for controlling the vehicle 10 based on the analysis result of the computing unit 3. The sensing system 1 particularly employs a background-model-free estimation. The sensing system 1 is configured to perform a local analysis of two neighboring motion vectors 6, which are computed from points 7a in images 5a, 5b of the image stream 2a, and to determine, whether the points 7a corresponding to these motion vectors 6 belong to a particularly moving object.

10 Claims, 4 Drawing Sheets

(56) References Cited

U.S. PATENT DOCUMENTS

| | | | |
|---|---|---|---|
| 8,903,161 B2* | 12/2014 | Kwak | G06T 7/0042 |
| | | | 382/153 |
| 2010/0226544 A1* | 9/2010 | Uchida | B60R 1/00 |
| | | | 382/107 |
| 2010/0305857 A1 | 12/2010 | Byrne et al. | |
| 2012/0121131 A1 | 5/2012 | Kim | |
| 2014/0195138 A1* | 7/2014 | Stelzig | G08G 1/0116 |
| | | | 701/119 |

OTHER PUBLICATIONS

Junxian Wang et al., "Overtaking Vehicle Detection Using Dynamic and Quasi-Static Background Modeling," Computer Vision and Pattern Recognition, 2005 IEEE Computer Society Conference, Jun. 25, 2005, XP031259704, 8 pages.

Miguel A. Sotelo et al., "Blind Spot Detection Using Vision for Automotive Applications," Journal of Zhejiang University, Science A 9(10), 2008, pp. 1369-1372.

Uwe Franke et al., "6D-Vision: Fusion of Stereo and Motion for Robust Environment Perception," 27th DAGM Symposium, Vienna, Austria, 2005, 8 pages.

Dennis Muller et al., "Motion Segmentation Using Interest Points," 2008 IEEE Intelligent Vehicles Symposium, The Netherlands, Jun. 4-6, 2008, pp. 19-24.

Bruce D. Lucas et al., "An Iterative Image Registration Technique with an Application to Stereo Vision," Proceedings of Imaging Understanding Workshop, 1981, pp. 674-679.

Berthold K. P. Horn et al., "Determining Optical Flow," Artificial Intelligence, vol. 17, No. 1-3, A.I. Memo No. 572, Apr. 1980, pp. 1-27.

* cited by examiner

SENSING SYSTEM AND METHOD FOR DETECTING MOVING OBJECTS

The present invention is directed to a sensing system and a sensing method for detecting moving objects in the surroundings of a vehicle. The surrounding or environment of the vehicle is the area which is detectable by one or more sensors provided to the vehicle. Generally, the vehicle may be an air, land or sea vehicle. Preferably, it is a land vehicle such as e.g. a car, truck, motorcycle, (electric) bicycle or scooter.

In particular, the sensing system and method can detect moving objects in an image sequence, especially objects that are about to change the distance, i.e. approach or retreat from the vehicle. In the vehicle domain the sensing system can support the driver by automatically monitoring the vehicle surroundings and warning the driver in case that an object approaches or comes dangerously close. Alternatively or additionally, the sensing system may issue a control signal to an actor of the vehicle (brakes, steering, . . . ) and/or to a safety device (safety belt pre-tensioning unit, . . . ).

Several approaches for detecting moving objects have been proposed in the prior art. For example, 'M. Á. Sotelo et al., *Blind spot detection using vision for automotive applications*, Journal of Zhejiang University, Science A 9(10):1369-1372 (2008) describes a typical camera-based object detection application for blind-spot monitoring that makes use of pixel motion information and uses cameras that view to the side or to the rear at a certain angle. The camera angle simplifies the problem, since all pixels corresponding to the background move in the opposite translational direction compared to pixels that correspond to approaching objects.

However, in particular blind spot monitoring for motorcycles requires a rear-view camera to observe areas outside of the direct view of the driver. As soon as the camera views directly to the rear, i.e. the optical axis is aligned with the moving direction of the vehicle, approaching objects can have an expanding pixel motion pattern in the image and static background areas have a contracting pixel motion pattern, which is induced by the ego-motion of the motorcycle. The occurring motion patterns have a higher degree of freedom as compared to pure translational movement, and thus the detection of objects becomes more difficult.

'J. Wang et al., *Overtaking Vehicle Detection Using Dynamic and Quasi-Static Background Modeling*, Proceedings of the 2005 IEEE Computer Society Conference on Computer Vision and Pattern Recognition (CVPR 2005)' and 'U. Franke et al., *6D-Vision: Fusion of Stereo and Motion for Robust Environment Perception*, 27th DAGM Symposium, Vienna, Austria (2005)' propose a solution to overcome the above-mentioned problem. The approach is designed to firstly detect the background motion, since it covers the largest part of the image, and secondly detect approaching objects by comparing their motion with the background motion. However, the disadvantage of such an approach is that errors in the first step influence all further processing steps in a negative way.

U.S. Pat. No. 7,925,441 B1 and US 2010/0305857 A1 also relate to the field of blind spot monitoring. However, an object detection stage is not described in detail, but rather an object is already detected by means of some other mechanism. With this knowledge, the time-to-collision from motion vectors that correspond to objects is computed.

U.S. Pat. No. 6,259,359 B1 describes a rear monitoring system for vehicles. In a first step, a special lens on the camera and information about side strips are used to estimate the vanishing point of the street. With this knowledge about the background and with the aid of optical flow, approaching vehicles are detected. Again, the detection part is not described in detail.

'D. Mueller et al., *Motion Segmentation Using Interest Points*, 2008 IEEE Intelligent Vehicles Symposium, Eindhoven, Netherlands (2008)' describes an approach, in which motion vectors are clustered based on their transformation properties and spatial relations. The motion vectors are found by using a connectivity graph. The connectivity graph is warped and tracked over time by applying a Kalman filter to predict the motion vectors. The graph is built based on interest point track similarity. The approach further uses a tracking-based estimation for calculating the motion vectors, which needs a proper state initialization, prediction, and has a higher delay of detection. Transformation parameters are calculated for a point using a maximum likelihood estimation using several neighboring points. Drawbacks of this approach are of computational nature and result in a limited estimation quality.

Most approaches of the prior art make use of known motion estimation (optical flow) methods. Optical flow methods can be roughly divided into two kinds, namely sparse motion estimation and dense motion estimation.

Sparse motion estimation is for example described in 'B. D. Lucas et al., *An iterative image registration technique with an application to stereo vision*, Proceedings of Imaging understanding workshop, pp 121-130 (1981)'.

Dense motion estimation is for example described in 'B. Horn et al., *Determining optical flow*, Artificial Intelligence, vol. 17, no. 1-3, pp. 185-203 (1981).

Sparse motion estimation methods only return motion information at well structured image points, whereas dense motion estimation methods describe the movement of each individual image pixel.

The present invention aims to improve the existing state-of-the-art approaches, in particular by overcoming their respective drawbacks. In particular, the objective problem of the present invention is to provide a system that can directly and efficiently detect moving objects, specifically approaching or retreating objects, with high accuracy and with low computational load.

Therefore, the sensing system of the present invention makes use of pixel motion information (optical flow) from consecutively acquired images. Approaching objects can be directly and efficiently detected from the motion information, without explicitly estimating or modeling any background motion. The prior art approaches typically apply the two step process discussed above (see also FIG. 1). The background is detected in a first step using a global model assumption, and moving objects are detected in a second step by using the information from the background estimation. This separation of background and moving objects is helpful for sequences acquired by a moving camera, because the motion of the object is overlaid with the motion of the background. However, the computational load is high.

The present invention improves the prior art and solves the above-mentioned objective problem by providing a sensing system and a sensing method according to the attached independent claims. The corresponding dependent claims further develop the advantages of the present invention.

In particular the present invention is directed to a sensing system for detecting moving objects in the surroundings of a vehicle. The sensing system comprises an imaging unit for acquiring images and generating an image stream consisting of a plurality of images.

The system further comprises a computing unit configured to receive the image stream from the imaging unit, select a plurality of points in a first image of the image stream, compute for each selected point in the first image a matching point in a second image of the image stream to obtain a 2D motion vector, select a plurality of point pairs from at least two of the selected points in the first image, compute for each selected point pair first transformation parameters by using the computed 2D motion vectors and the 2D coordinates of the two points of the point pair, and group each selected point pair into a transformation class based on the computed first transformation parameters to obtain first class information.

The sensing system further comprises a control unit for controlling the behavior of the vehicle or for issuing a warning indication based on the first class information received from the computing unit.

The imaging unit may be at least one camera, which can be mounted onto the vehicle. The imaging unit can also be more than one camera or can be some other optical imaging device. For the selection of the points in the first image, state-of-the-art point selection techniques can be used. Moreover, state-of-the-art optical flow techniques can be used for calculating the 2D motion vectors. Optical flow techniques (especially sparse optical flow techniques) are preferred for computational reasons, i.e. for reducing the computational load in the sensing system. In particular, no tracking based estimation has to be used, which would need a proper state initialization, prediction, and would have a higher delay of detection.

A 2D motion vector describes a pixel motion between two images. Since the transformation parameters are calculated based on image points and 2D motion vectors, which are independently estimated at each time step, no prediction step has to be carried out by the system. Moreover, the transformation parameters are based only on a single pair of image points and their 2D motion vectors, which is computationally very cheap.

Advantageously the first transformation parameters are scaling factors of the selected point pair in the first image with respect to a matching point pair in the second image, and the computing unit is configured to group each selected point pair into a transformation class based on the scaling factors.

The transformation parameters can be vertical and horizontal scaling factors, which can both be either positive or negative. Positive scaling factors describe approaching objects, whereas negative scaling factors describe retreating objects. For every pair of neighboring 2D motion vectors, the system can decide based on the sign of the scaling factors, whether the 2D motion vectors correspond e.g. to an approaching or a retreating object. Accordingly, the transformation classes can e.g. be set to "approaching" and "retreating".

Advantageously, for selecting the point pairs from the selected points in the first image, the computing unit is configured to build a connectivity graph on the selected points in the first image, and select each point pair from two endpoints of an edge in the connectivity graph.

The system is free at every time step to generate the connectivity graph according to the currently selected points. Further, the system can make a direct decision, whether motion vectors correspond to approaching or retreating objects, without needing to fit any clusters as in the prior art. This drastically reduces computational effort.

Advantageously, the computing unit is configured to obtain the connectivity graph by performing a triangulation method.

The triangulation method can e.g. be a Delaunay triangulation. A simple connectivity graph (neighborhood graph) can thus be obtained.

Advantageously, the computing unit is configured to calculate for at least one triangle, which is obtained by the triangulation method, second transformation parameters by combining the first transformation parameters for three point pairs that correspond to the three edges of the triangle, and group each point of the at least one triangle into a transformation class based on the second transformation parameters to obtain second class information, and the control unit is configured to control the behavior of the vehicle or issue a warning indication based on the second class information obtained by the computing unit.

The transformation classes can again be set to e.g. "approaching", "retreating" or the like. The second class information obtained through the triangulation method achieves more accurate results with still low computational load.

Advantageously, the computing unit is further configured to post-process the first class information by integrating the first class information over time in a separate integration map by using the positions of the point pairs for spatial accumulation, and the control unit is configured to control the behavior of the vehicle or issue a warning indication by using the post-processed first class information.

Advantageously, the computing unit is further configured to post-process the second class information by integrating the second class information over time in a separate integration map by using the positions of triangles obtained by the triangulation method for spatial accumulation, and the control unit is configured to control the behavior of the vehicle or issue a warning indication by using the post-processed second class information.

By post-processing the first and/or the second class information, the object detection accuracy of the sensing system can be improved.

Advantageously, the imaging unit is mounted on the vehicle, and the control unit is configured to control the behavior of the vehicle or issue the warning indication, if one or more objects approach or retreat from the vehicle.

The vehicle can e.g. be a robot or a land, sea or air vehicle. The camera is preferably mounted on the rear of the vehicle to monitor objects. However, it is also possible to use more than one camera. Then the different cameras can also be directed into different direction, e.g. the front side of the sides of the vehicle.

The present invention is further directed to a sensing method for detecting moving objects in the surroundings of a vehicle, comprising the steps of acquiring images and generating an image stream of a plurality of images, selecting a plurality of points in a first image of the image stream, computing for each selected point in the first image a matching point in a second image of the image stream to obtain a 2D motion vector, selecting a plurality of point pairs from at least two of the selected points in the first image, computing for each selected point pair first transformation parameters by using the computed 2D motion vectors and the 2D coordinates of the two points of the point pair, grouping each selected point pair into a transformation class based on the computed first transformation parameters to obtain first class information, and controlling the behavior of the vehicle or issuing a warning indication based on the first class information.

The sensing system and the method of the present invention are able to carry out as shown in FIG. 2 a background-model-free estimation, especially in the case that the camera is mounted to the front or rear of the ego-vehicle. The basic insight of the present invention is that a local analysis of two neighboring motion vectors can reveal, whether the two motion vectors (and thus the two corresponding points) belong to a particularly moving object (i.e. for example an approaching or retreating object) or not. The approach of the present invention saves significant computational resources and is able to avoid misdetections that are due to errors in the background detection step. To allow a proper detection in the described way, knowledge about the moving direction of the imaging unit (i.e. whether it is currently moving forwards or backwards) is advantageous.

In summary, the present invention provides a sensing system that can directly and efficiently detect moving objects, specifically objects that approach or retreat from an ego-vehicle (on which the sensing system is installed), with high accuracy and low computational load.

In the following, the present invention is explained in more detail with respect to the attached drawings.

Figure 1:
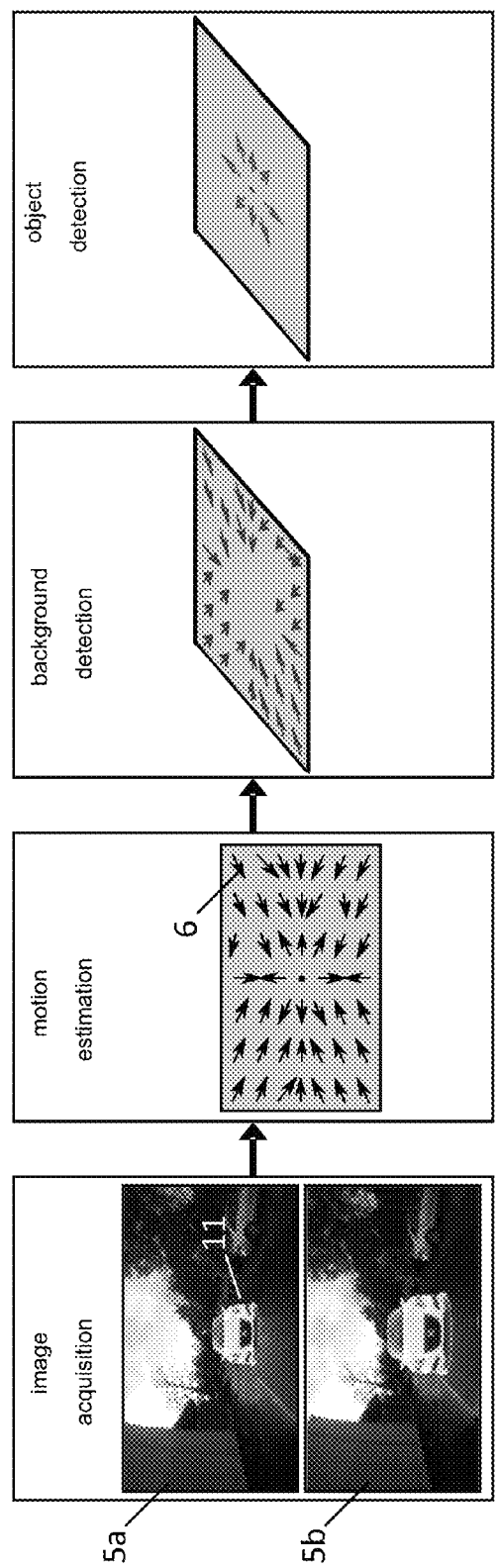
FIG. 1 shows a state of the art approach for detecting moving objects.
Figure 2:
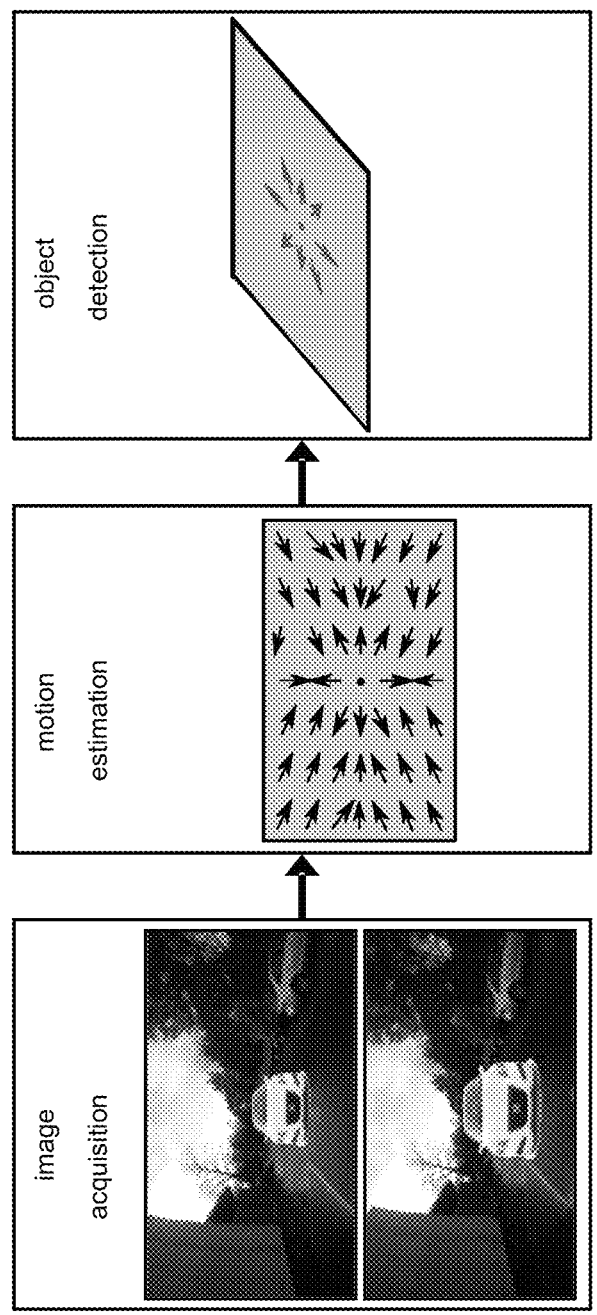
FIG. 2 shows a basic approach for detecting moving objects according to the present invention.
Figure 3:
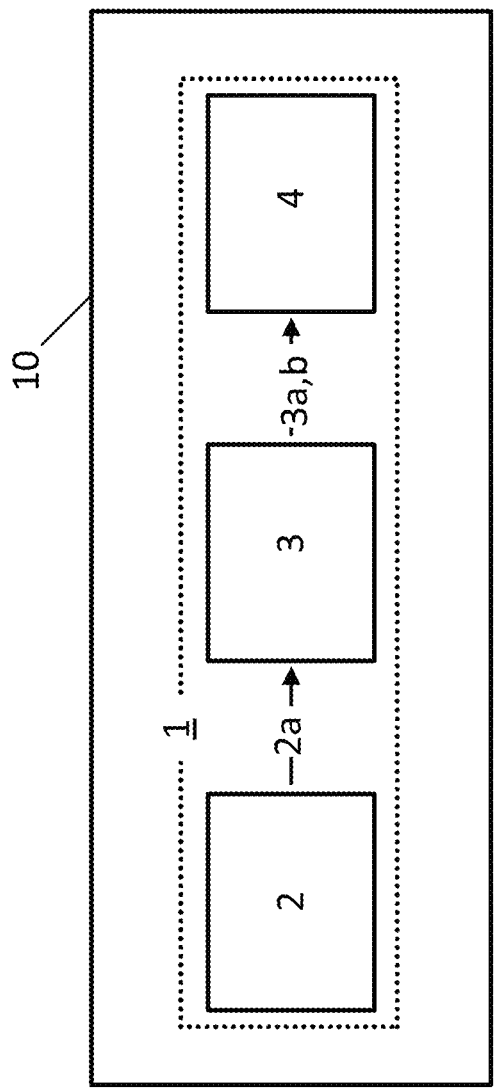
FIG. 3 shows a schematic diagram of a sensing system of the present invention.

In FIG. 3 the sensing system 1 of the present invention is schematically illustrated. The sensing system 1 comprises at least one imaging unit 2, a computing unit 3 and a control unit 4. The components can be mounted onto a vehicle 10 (ego-vehicle). The sensing system 1 can be powered from a battery of the vehicle 10 and can further be connected to a movement control unit of the vehicle 10. Nevertheless, the sensing system 1 can also have its own power supply.

The imaging unit 2 can be at least one camera (operating e.g. on visible or infrared light) or can be any other imaging device, e.g. a laser imaging device or a radar imaging device, which is suited to obtain images of objects 11 in the surroundings of the vehicle 10. Preferably, at least one imaging unit 2 is mounted such that it monitors the rear side of the vehicle 10. Other imaging units 2 can be installed as well, in order to monitor e.g. the front and/or left and right sides of the vehicle 10. The imaging unit 2 can obtain a plurality of images, and can generate an image stream 2a that is composed of some or of all of the plurality of obtained images. The image stream 2a is output from the imaging unit 2 and is fed into the computing unit 3.

The computing unit 3 can e.g. be a microprocessor or preferably a graphics processing unit (e.g. consisting of a graphic processor and a graphic memory). The computing unit 3 is able to compute 2D motion vectors 6 between pixels in two images 5a, 5b (e.g. consecutive images) of the image stream 2a. The computing unit 3 can also compute first transformation parameters for a pair of 2D motion vectors 6, and can classify points 7a corresponding to these motion vectors 6 based on the calculated first transformation parameters. The computing unit is coupled to the control unit 4, and can feed data to the control unit 4. The details of the computing unit 3 are explained below.

The control unit 4 can be e.g. a microprocessor, which is able to control the behavior of the vehicle 10 based on data received from the computing unit 3. For example, the control unit 4 can output command signals that cause the vehicle 10 to break, steer left or right, accelerate and/or decelerate. The control unit 4 can alternatively or additionally issue command signals that cause the vehicle 10 to issue a warning signal (e.g. optically, acoustically or as a vibration). To this end, the control unit 4 of the sensing system 1 can be coupled to a movement control unit of the vehicle 10.

Figure 4:
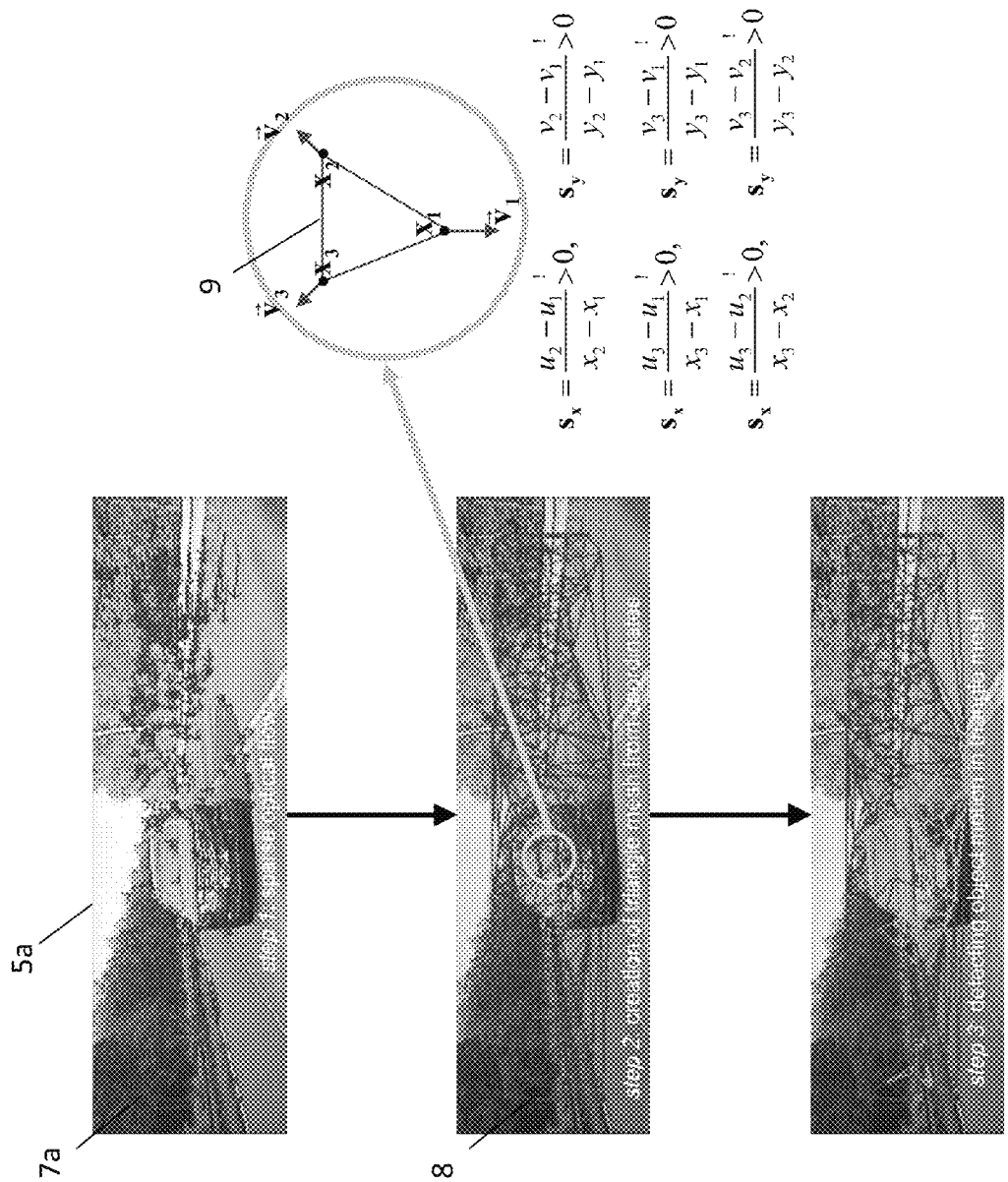
FIG. 4 shows an approach for detecting moving objects according to the present invention.

For computational reasons the sensing system 1 of the present invention makes use of standard sparse optical flow estimation. The sparse optical flow is shown in step 1 of FIG. 4. In particular, the computing unit 3 is adapted to select a plurality of points 7a in a first image 5a of the image stream 2a. The selected points 7a are also called interest points, and can be calculated by the computing unit 3 according to some preset algorithm, e.g. an algorithm based on a learned or programmed probability to find objects 11 in a certain region of an image. For each selected point 7a a 2D motion vector 6 is estimated.

For estimating the 2D motion vector 6, the computing unit 3 needs to find a point in a second image 5b of the input stream 2a that matches the selected point 7a. The second image 5b can e.g. be a subsequent image of the image stream 2a. For finding the matching point in the second image 5b, the computing unit 3 can e.g. compare properties of a pixel (that corresponds to the selected point 7a) in the first image 5a with properties of pixels in the second image 5b, and choose the best matching as matching point 7b. Alternatively, luminescence values or an average luminescence value of a patch of pixels (a pixel block) around the selected point 7a in the first image 5a can be compared with luminescence values or an average luminescence value of patches in the second image 5b. Again, the best matching pixel block can be chosen, and e.g. the center pixel of that pixel block is chosen as matching pixel. State-of-the-art methods can be employed here.

The computing unit 3 can then calculate whether a pair of 2D motion vectors 6 describe a contracting or an expanding motion, i.e. it can calculate one or more scaling factors of two selected points 7a in the first image, which correspond to the pair of 2D motion vectors 6, in respect to two matching points in the second image 5b as the first transformation parameters. The scaling factors are, for example, vertical scaling factors sy and/or horizontal scaling factors sx. Each scaling factor can have a positive or negative sign. Based on the scaling factors sx, sy, the computing unit 3 can then perform a classification, e.g. determine classes like "retreating" or "approaching" for a pair of points 7a. These points then belong to a particularly moving object 11. For the classification the computing unit 3 can for example determine the sign of each scaling factor sx, sy. If, for example, both scaling factors sx, sy are positive, the corresponding points 7a are classified as approaching the vehicle 10. If both scaling factors sx, sy are negative, the corresponding points 7a are classified as retreating from the vehicle 10. This class information is output from the computing unit 3 to the control unit 4. Based on class information of all pixels, moving objects 11 can be accurately detected, and whether they approach or retreat from the vehicle 10 can be determined.

The transformation parameters can be calculated by the computing unit 3 as follows. For making a decision, whether selected points 7a (i.e. for example selected pixels) in an image 5a belong to a foreground object 11, the computing unit 3 requires at least two motion vectors 6. As stated before, a motion vector 6 describes the corresponding pixel motion between two images 5a, 5b (to be precise the motion between small patch areas around two pixels in the two images). For simplicity, the computing unit 3 assumes that two neighboring motion vectors 6 describe a scaling motion S and a translational motion T. Rotational components are neglected as they are assumed to be small in a local area. By subtracting those two neighboring motion vectors 6 from each other, the computing unit 3 is configured to eliminate the translational component:

$$\vec{v}_2 - \vec{v}_1 = (Sx_2 + T) - (Sx_1 + T)$$

$$\Rightarrow \vec{v}_2 - \vec{v}_1 = S(x_2 - x_1), \text{ where } S = \begin{pmatrix} s_x & 0 \\ 0 & s_y \end{pmatrix}, T = \begin{pmatrix} t_x \\ t_y \end{pmatrix}$$

$$\text{and } x_1 = \begin{pmatrix} x_1 \\ y_1 \end{pmatrix}, x_2 = \begin{pmatrix} x_2 \\ y_2 \end{pmatrix}$$

are the coordinates of $$\text{vectors } \vec{v}_1 = \begin{pmatrix} u_1 \\ v_1 \end{pmatrix} \text{ and } \vec{v}_2 = \begin{pmatrix} u_2 \\ v_2 \end{pmatrix}$$

Rearranging the equation above yields:

$$\begin{pmatrix} s_x \\ s_y \end{pmatrix} = \begin{pmatrix} \frac{u_2 - u_1}{x_2 - x_1} \\ \frac{v_2 - v_1}{y_2 - y_1} \end{pmatrix} \quad (1)$$

Based on equation (1), a local decision can be made by the computing unit 3, whether two points 7a (pixels) describe an approaching (sx>0, sy>0) or retreating (sx<0, sy<0) motion.

An object 11 can thus be easily detected from all selected points 7a, if the object 11 is approximately moving in the same direction as the imaging unit 2, but with higher or lower speed. In the case of an object 11 approaching a forward-moving vehicle 10 from behind, the approaching object 11 (i.e. all points 7a of the object 11) exhibits opposite scaling as compared to the background (expanding vs. contracting). This means that the scaling factors $s_x$ and $s_y$ of the points 7a of object 11 have a different sign compared to the scaling factors of the background, and the computing unit 3 can hence make a decision based on a simple sign check. There is no need for the computing unit 3 to estimate the scaling factor of the background, since only the sign of the scaling factors sx and sy is necessary, which is directly coupled to the movement direction of the imaging unit 2 mounted on the vehicle 10.

Information concerning the movement of the vehicle 10 can be obtained by the computing unit 3 by monitoring either context data or intrinsic data. Context data can be obtained by one or more context sensors. Examples for context sensor are GPS or radio communication to determine the location and/or speed of the vehicle 10. Intrinsic data can be obtained from a movement control unit, e.g. a board computer of the vehicle 10. The computing unit 3 can in this way be supplied with information concerning the operation of the vehicle 10, e.g. speed, acceleration, facing direction of the vehicle 10, GPS data or the like.

The computing unit 3 is further configured to create a local relation between the coordinates of the measured motion vectors 6. Therefore, a connectivity graph 8 can be computed by the computing unit 3 as shown in step 2 of FIG. 4. The connectivity graph 8 is based on the positions of the selected points 7a. However, other data like the motion vectors 6 can also be included into the graph method, since the overall procedure does not critically depend on the type of graph 8.

To obtain the connectivity graph 8, for example a triangle mesh can be created from the coordinates of the selected points 7a. Such a triangle mesh can e.g. be calculated by using Delaunay triangulation. The Delaunay triangulation method has the specific property that within a circle that is drawn around three coordinates of three selected points 7a, a triangle 9 does not contain any other coordinates of the mesh, so that it provides an appropriate triangulation. The triangulation method is shown in step 2 of FIG. 4.

For each 2D motion vector pair in this triangle mesh, the computing unit 3 is adapted to calculate second transformation parameters by combining the first transformation parameters for three point pairs that correspond to three edges of a triangle 9 in the triangle mesh. The computing unit 3 e.g. checks equation (1), and determines for the motion vectors 6 in the triangle 9, whether the sign of the scaling factors sx, sy is positive or negative. Since a triangle 9 has three motion vectors 6 corresponding to three points 7a, as shown in step 2 in FIG. 3, three pairs of motion vectors 6 have to be analyzed regarding sx and sy. If the conditions (e.g. the signs of the scaling factors) correspond to the conditions of a moving object 11, those motion vectors 6 are regarded as potentially corresponding to a moving object 11. A combination of the three calculated transformation parameters yields the second transformation parameters. The computing unit 3 can then classify the points 7a that compose the triangle 9 based on the first transformation parameters and/or the second transformation parameters.

In total the computing unit 3 calculates for each edge in the connectivity graph 8 transformation parameters (scale transformation parameters) by using the edge point positions and 2D motion vectors 6. When the computing unit 3 has classified the selected points 7a (point pairs), i.e. when it has grouped all point pairs into a transformation class (e.g. "approaching" or "retreating"), it computes class information 3a, 3b. The class information 3a, 3b is an output signal that contains information about the transformation class of all selected point pairs, and thus contains information about which points 7a belong to a moving object 11. The computing unit 3 outputs the class information 3a, 3b to the control unit 4. The control unit can interpret the class information 3a, 3b, and can determine from the class information 3a, 3b the positions and movement directions of moving objects 11 in the image stream 2a. The control unit 4 can then control the behavior of the vehicle 10 according to the class information, i.e. according to one or more moving objects 11. The control unit 4 can e.g. warn the driver of a moving object 11 or can automatically avoid a collision with a moving object 11.

In summary the sensing system 1 directly and efficiently detects moving objects 11, specifically objects 11 approaching or retreating from the vehicle 10, with high accuracy and with low computational load.

What is claimed is:

1. A sensing system for detecting moving objects in the surroundings of a vehicle, comprising
   an imaging unit for acquiring images and generating an image stream consisting of a plurality of images; and
   a computing unit configured to
   receive the image stream from the imaging unit,
   select a plurality of points in a first image of the image stream, compute for each selected point in the first image a matching point in a second image of the image stream to obtain 2D motion vectors,
compute a connectivity graph based on the selected points, wherein the connectivity graph represents local relations between the selected points,
select a plurality of point pairs based on the connectivity graph, wherein each point pair represents two endpoints of an edge in the connectivity graph,
compute for each selected point pair first transformation parameters by using the computed 2D motion vectors and 2D coordinates of the selected point pairs,
group each selected point pair into a transformation class based on the computed first transformation parameters to obtain first class information; and
a control unit for controlling the behavior of the vehicle or for issuing a warning indication based on the first class information received from the computing unit.

2. A sensing system according to claim 1, wherein
the first transformation parameters are scaling factors of the selected point pair with the first image in respect to a matching point pair in the second image, and
the computing unit is configured to group each selected point pair into a transformation class based on the scaling factors.

3. A sensing system according to claim 1, wherein
the computing unit is configured to obtain the connectivity graph by performing a triangulation method.

4. A sensing system according to claim 3, wherein
the computing unit is configured to
calculate for at least one triangle, which is obtained by the triangulation method, second transformation parameters by combining the first transformation parameters for three point pairs that correspond to the three edges of the triangle, and
group each point of the at least one triangle into a transformation class based on the second transformation parameters to obtain second class information, and
the control unit is configured to control the behavior of the vehicle or issue a warning indication based on the second class information received from the computing unit.

5. A sensing system according to claim 3, wherein
the computing unit is further configured to post-process the second class information by integrating the second class information over time in a separate integration map by using the positions of triangles obtained by the triangulation method for spatial accumulation, and
the control unit is configured to control the behavior of the vehicle or issue a warning indication by using the post-processed second class information.

6. A sensing system according to claim 1, wherein
the computing unit is further configured to post-process the first class information by integrating the first class information over time in a separate integration map by using the positions of the point pairs for spatial accumulation, and
the control unit is configured to control the behavior of the vehicle or issue a warning indication by using the post-processed first class information.

7. A sensing system according to claim 1, wherein
the imaging unit is mounted on the vehicle, and
the control unit is configured to control the behavior of the vehicle or issue the warning indication, if one or more objects approach or retreat from the vehicle.

8. A sensing method for detecting moving objects in the surroundings of a vehicle, comprising the steps of:

acquiring images and generating an image stream of a plurality of images;
selecting a plurality of points in a first image of the image stream;
computing for each selected point in the first image a matching point in a second image of the image stream to obtain 2D motion vectors;
computing a connectivity graph based on the selected points, wherein the connectivity graph represents local relations between the selected points,
selecting a plurality of point pairs based on the connectivity graph, wherein each point pair represents two endpoints of an edge in the connectivity graph;
computing for each selected point pair first transformation parameters by using the computed 2D motion vectors and 2D coordinates of the selected point pairs;
grouping each selected point pair into a transformation class based on the computed first transformation parameters to obtain first class information; and
controlling the behavior of the vehicle or issuing a warning indication based on the first class information.

9. A computer software program, embodied on a non-transitory computer readable medium, the computer program, when executed by a processor, causes the processor to:
acquire images and generate an image stream of a plurality of images;
select a plurality of points in a first image of the image stream;
compute for each selected point in the first image a matching point in a second image of the image stream to obtain 2D motion vectors;
compute a connectivity graph based on the selected points, wherein the connectivity graph represents local relations between the selected points,
select a plurality of point pairs based on the connectivity graph, wherein each point pair represents two endpoints of an edge in the connectivity graph;
compute for each selected point pair first transformation parameters by using the computed 2D motion vectors and 2D coordinates of the selected point pairs;
group each selected point pair into a transformation class based on the computed first transformation parameters to obtain first class information; and
control the behavior of the vehicle or issuing a warning indication based on the first class information.

10. A land, sea or air vehicle provided with a sensing system for detecting moving objects in the surroundings of the vehicle, comprising:
an imaging unit for acquiring images and generating an image stream consisting of a plurality of images; and
a computing unit configured to
receive the image stream from the imaging unit,
select a plurality of points in a first image of the image stream,
compute for each selected point in the first image a matching point in a second image of the image stream to obtain 2D motion vectors,
compute a connectivity graph based on the selected points, wherein the connectivity graph represents local relations between the selected points,
select a plurality of point pairs based on the connectivity graph, wherein each point pair represents two endpoints of an edge in the connectivity graph,
compute for each selected point pair first transformation parameters by using the computed 2D motion vectors and 2D coordinates of the selected point pairs, group each selected point pair into a transformation class based on the computed first transformation parameters to obtain first class information; and a control unit for controlling the behavior of the vehicle or for issuing a warning indication based on the first class information received from the computing unit.

* * * * *